(12) United States Patent
Agarwal

(10) Patent No.: US 11,269,937 B2
(45) Date of Patent: Mar. 8, 2022

(54) SYSTEM AND METHOD OF PRESENTING INFORMATION RELATED TO SEARCH QUERY

(71) Applicant: Innoplexus AG, Eschborn (DE)

(72) Inventor: Vatsal Agarwal, Rampur (IN)

(73) Assignee: Innoplexus AG, Eschborn (DE)

( * ) Notice: Subject to any disclaimer, the term of this patent is extended or adjusted under 35 U.S.C. 154(b) by 284 days.

(21) Appl. No.: 16/147,678

(22) Filed: Sep. 29, 2018

(65) Prior Publication Data
US 2020/0104416 A1    Apr. 2, 2020

(51) Int. Cl.
| | |
|---|---|
| G06F 16/00 | (2019.01) |
| G06F 16/33 | (2019.01) |
| G06F 16/248 | (2019.01) |
| G06F 16/242 | (2019.01) |
| G06F 16/2457 | (2019.01) |
| G06F 16/28 | (2019.01) |

(52) U.S. Cl.
CPC ........ *G06F 16/3334* (2019.01); *G06F 16/248* (2019.01); *G06F 16/2428* (2019.01); *G06F 16/24578* (2019.01); *G06F 16/288* (2019.01); *G06F 16/3346* (2019.01)

(58) Field of Classification Search
CPC .......... G06F 16/2428; G06F 16/24578; G06F 16/248; G06F 16/3334
See application file for complete search history.

(56) References Cited

U.S. PATENT DOCUMENTS

| | | | | |
|---|---|---|---|---|
| 2007/0106499 | A1* | 5/2007 | Dahlgren | G06F 16/243 704/10 |
| 2014/0280179 | A1* | 9/2014 | Coleman | G06F 16/3323 707/740 |
| 2016/0140858 | A1* | 5/2016 | Adderly | G06F 40/40 704/9 |
| 2016/0232537 | A1* | 8/2016 | Nonez | G06Q 10/0633 |
| 2019/0108262 | A1* | 4/2019 | Scolnick | G06F 16/288 |

* cited by examiner

*Primary Examiner* — Diedra McQuitery (74) *Attorney, Agent, or Firm* — Ziegler IP Law Group, LLC (57) ABSTRACT

Disclosed is system for presenting information related to a search query, comprising: a client device configured to receive the search query; a database arrangement; an ontological databank and a server arrangement communicably coupled to the client device and the database arrangement, wherein the server arrangement is configured to: receive the search query, segment the search query into one or more query segments; identify one or more query concepts associated with one or more query segments, wherein each of the one or more query concepts are tagged with a corresponding entity class; determine a data structure for the information related to the search query based on one or more metrics of the relationships of the one or more query concepts, and render, on the client device, the information related to the search query presented in the data structure.

10 Claims, 2 Drawing Sheets

SYSTEM AND METHOD OF PRESENTING INFORMATION RELATED TO SEARCH QUERY

TECHNICAL FIELD

The present disclosure relates generally to systems for presenting information; and more specifically to systems for presenting information related to search query. Furthermore, the present disclosure also relates to methods of presenting information related to search query.

BACKGROUND

With advancements in digital technology, there has been an exponential increase in the amount of data being generated. Typically, a generated data from various sources is stored in the form of various files, records and the like, in a database system (namely, a database warehouse or a data repository). In such case, extraction of useful information from a large amount of stored data becomes more critical. Consequently, to retrieve such useful information efficiently from the database system, a query (namely, a request) is generated. In such a case, the stored data within the database is examined and the useful information is extracted, thereby assembling the useful information in response to the query.

However, the query generated is addressed by a plurality of results associated therewith, owing to scattered nature of the information on the database system. Typically, the query is addressed by assembling the results in response to the query in form of a list, a table, and so forth. However, such response to the queries comprise useful information in a scattered manner. Moreover, the plurality of results associated with the queries may comprise irrelevant information along with the useful information. Subsequently, each of the plurality of results associated with the queries is addressed so as to extract the useful information. In an example, an organization may search for information about educational background of family members of an individual. In such case, a result for the provided query may be scattered across various documents in a database thereby. Consequently, the organization may have to address each of the document so as to determine a useful information related to each of the family member of the individual. Comprehending of the useful information from the results associated with the queries becomes rigorous and time-consuming. This further hampers the usability and accessibility of useful information from the results.

Presently, several tools are used for retrieving information stored in one or more database. However, the existing tools only allows filtering of the results associated with a query using predefined filters. Moreover, the predefined filters are not directly dependent on the query provided. As a result, the results still have to be comprehend for retrieving useful information. Some existing tools processes the searched information to retrieve processed information. However, the processed information still has irrelevant information even after processing of the searched information.

Therefore, in light of the foregoing discussion, there exists a need to overcome the aforementioned drawbacks by retrieving the required information.

SUMMARY

The present disclosure seeks to provide a system for presenting information related to a search query. The present disclosure also seeks to provide a method of presenting information related to a search query. The present disclosure seeks to provide a solution to the existing problem of incomprehensible and complicated presentation of information related to the search query. An aim of the present disclosure is to provide a solution that overcomes at least partially the problems encountered in prior art, and provides an optimal and easily comprehensible approach for presenting information relating to the search query.

In one aspect, an embodiment of the present disclosure provides a system for presenting information related to a search query, wherein the system comprises:
  a client device configured to receive the search query;
  a database arrangement;
  an ontological databank, comprising a plurality of entity classes, wherein each of the plurality of entity classes comprises concepts therein, and wherein the concepts in each of the plurality of entity classes have relationships with concepts in remaining entity classes; and
  a server arrangement communicably coupled to the client device, the ontological databank and the database arrangement, wherein the server arrangement is configured to:
    receive the search query, from the client device;
    segment the search query into one or more query segments;
    identify one or more query concepts associated with the one or more query segments, wherein each of the one or more query concepts are tagged with a corresponding entity class;
    determine a data structure for the information related to the search query based on one or more metrics of the relationships of the one or more query concepts, wherein the information related to the search query is based on one or more documents, retrieved from the database arrangement; and
    render, on the client device, the information related to the search query presented in the data structure.

In another aspect, an embodiment of the present disclosure provides a method of presenting information related to a search query, wherein the method is implemented via a system comprising:
  a client device configured to receive the search query;
  a database arrangement;
  an ontological databank, comprising a plurality of entity classes, wherein each of the plurality of entity classes comprises concepts therein, and wherein the concepts in each of the plurality of entity classes have relationships with concepts in remaining entity classes; and
  a server arrangement communicably coupled to the client device, the ontological databank and the database arrangement, wherein the method comprises:
    receiving the search query, from the client device;
    segmenting the search query into one or more query segments;
    identifying one or more query concepts associated with the one or more query segments, wherein each of the one or more query concepts are tagged with a corresponding entity class;
    determining a data structure for the information related to the search query based on one or more metrics of the relationships of the one or more query concepts, wherein the information related to the search query is based on one or more documents, retrieved from the database arrangement; and
    rendering, on the client device, the information related to the search query presented in the data structure.

Embodiments of the present disclosure substantially eliminate or at least partially address the aforementioned problems in the prior art, and enables retrieval of information in comprehensible manner in form of visual representation allowing inferences to be deduced.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for presenting information related to a search query, wherein the system comprises:
  a client device configured to receive the search query;
  a database arrangement;
  an ontological databank, comprising a plurality of entity classes, wherein each of the plurality of entity classes comprises concepts therein, and wherein the concepts in each of the plurality of entity classes have relationships with concepts in remaining entity classes; and
  a server arrangement communicably coupled to the client device, the ontological databank and the database arrangement, wherein the server arrangement is configured to:
    receive the search query, from the client device;
    segment the search query into one or more query segments;
    identify one or more query concepts associated with the one or more query segments, wherein each of the one or more query concepts are tagged with a corresponding entity class;
    determine a data structure for the information related to the search query based on one or more metrics of the relationships of the one or more query concepts, wherein the information related to the search query is based on one or more documents, retrieved from the database arrangement; and
    render, on the client device, the information related to the search query presented in the data structure.

In another aspect, an embodiment of the present disclosure provides a method of presenting information related to a search query, wherein the method is implemented via a system comprising:
  a client device configured to receive the search query;
  a database arrangement;
  an ontological databank, comprising a plurality of entity classes, wherein each of the plurality of entity classes comprises concepts therein, and wherein the concepts in each of the plurality of entity classes have relationships with concepts in remaining entity classes; and
  a server arrangement communicably coupled to the client device, the ontological databank and the database arrangement, wherein the method comprises:
    receiving the search query, from the client device;
    segmenting the search query into one or more query segments;
    identifying one or more query concepts associated with the one or more query segments, wherein each of the one or more query concepts are tagged with a corresponding entity class;
    determining a data structure for the information related to the search query based on one or more metrics of the relationships of the one or more query concepts, wherein the information related to the search query is based on one or more documents, retrieved from the database arrangement; and
    rendering, on the client device, the information related to the search query presented in the data structure.

The present disclosure provides the aforementioned system and the aforementioned method for representing the retrieved information in a comprehensible manner. Beneficially, the system described herein allows visual representation of the retrieved information in a manner that the retrieved information is comprehensible to obtain the required information without spending additional time and applying additional efforts. Additionally, the visual representation of the retrieved information is not predefined and is tailored based on the search query.

The system presents search results related to the search query. The system refers to a collection of one or more programmable and non-programmable components that are operable to receive the search query from a user and present the information related to the search query.

Throughout the present disclosure, the term "search query" relates to a query which is used for searching information stored in the database arrangement. In other words, search query is used as a basis for retrieving the information related thereto. Further, the term query refers to a question about which information is required and/or about which more clarity about information known previously is required by a user. In an example, search query is 'drugs for lung cancer'. In another example, search query is 'heart attack'.

In an embodiment, the search query is in form of text. The search query in form of text is a single word or a combination of words. In an example, search query in form of single word text is 'cancer'. In an example, search query in form of combination of words is 'lung cancer' based on information related to the search query 'lung cancer'.

In an embodiment, the search query is in form of image wherein the image comprises text therein. The text in the image is further extracted and thereby the extracted text is used as the basis on which the information related to the extracted text is obtained. In an example, the search query is an image comprising a text such as 'lung cancer symptoms'. Therefore, the text 'lung cancer symptoms' is used as search query.

Throughout the present disclosure, the term "information related to search query" refers to data related to the search query. Specifically, the one or more documents present in the database arrangement is analyzed and the information related to the search query is obtained therefrom. It will be appreciated that information related to the search query provides significant insights to a user (entering the search query) as compared to merely providing one or more documents related to the search query to the user.

Throughout the present disclosure, the term "one or more documents" refers to the documents, retrieved from the database arrangement, based on the search query. In other words, one or more documents refer to documents retrieved from the database arrangement using conventional keyword-based searching techniques. The one or more documents are retrieved from the database arrangement and information relating to the search query is derived therefrom. Various embodiments relating to information relating to the search query obtained from the one or more documents are described herein later.

Optionally, the system provides presents the information related to the search query in a comprehensible manner. Specifically, information related to the search query is presented so that inferences can conveniently be obtained therefrom. Notably, information related to the search query presented in a visual format provides convenience in obtaining inferences compared to search results in form of only text. In an example, conventional search results presenting text information scattered in different documents provides difficulty to a user in obtaining any insights related to the search query. In another example, search results presenting visual representations based on the information scattered in different documents provides convenience in obtaining insights. The insights related to the search query refer to obtaining desired results corresponding to the search query. The inferences obtained from the desired results allow the user to make decisions. In an example, a search query such as "heart attack symptoms" is accepted by a conventional system to present search results in form of text information about various symptoms related to heart attack stored in various documents. Therefore, the aforesaid conventional search results provide difficulty in obtaining an inference about the symptoms of heart attacks. In another example, a search query such as "heart attack symptoms" is accepted by the system of the present disclosure to present search results in form of a visual representation such as a pie chart about various symptoms and their severity related to heart attack. Therefore, the pie chart representation provides convenience in obtaining an inference about the symptoms of heart attacks.

The system comprises the client device configured to receive the search query.

Throughout the present disclosure, the term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as memory, a processor, a network adapter, and the like, to store and process information pertaining to the document and to communicate the processed information to other computing components, for example, such as a client device.

Throughout the present disclosure, the term "server" generally refers to a device executing an application, program, or process in a client/server relationship that responds to requests for information or services by another application, program, process, or device (namely, a client) on a data communication network. Optionally, a given server is implemented by way of a device executing a computer program that provides various services (for example, such as a database service) to other devices, modules, or apparatus.

The system comprises the client device configured to receive the search query. The term "client device" generally refers to a device executing an application, program, or process in a client/server relationship that requests information or services from another application, program, process, or device (namely, a server) on a data communication network. Importantly, the terms "client" and "server" are relative, as an application may be a client to one application but a server to another application. The client device is a combination of software and hardware components. The client device allows the user (such as an individual and/or organization) to enter the search query. In an example, the client device can be implemented using but not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, large-sized touch screens with embedded PCs, a server, and Network-Attached Storage (NAS) devices. The user enters the search query corresponding to the information required by the user. In an example, the user enters a search query such as 'heart attack' on a personal computer to obtain information related to heart attack required by the user. Furthermore, the client device comprises a memory, a display, a processor and so forth.

In an embodiment, the user enters the search query on client device in form of a text or an image or combination of both. In an example, the user enters a search query on a mobile phone, in form of a text such as 'heart attack symptoms' corresponding to the information related to conditions of a patient that can cause heart attack, required by the user. In another embodiment, the user enters the search query in form of a text in different languages. In an example, the user enters a search query in form of text in English language, French language, Hindi language, and the like. In an embodiment, the system converts the language in which search query is entered into a standard language, wherein standard language is the language in which the information is stored in all the documents such that information which are not in standard language are converted into standard language by the system. In an example, the system may have all information stored in a standard language such as English language thereby the information which is in different language such as German language, is then converted into English language. In such a case, the search query entered by the user in any language is converted into English language.

Throughout the present disclosure, the term "database arrangement" relates to an organized body of information regardless of the manner in which the information or the organized body thereof is represented. In an example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. The database arrangement comprises at least one database. The database arrangement is configured to obtain the plurality of documents, store the plurality of documents, and provide the one or more documents related to the search query from the plurality of documents. It is to be understood that the term "database arrangement" generally refers to hardware, software, firmware, or a combination of these for storing information in an organized manner, thereby, allowing for easy storage, access (namely, retrieval), updating and analysis of the data. In an embodiment, the database arrangement comprising one database constitutes different types of documents. In an embodiment, the database arrangement comprising one or more database constitutes one type of documents in one database. The different types of documents refer to classification of documents based on parameters such as language of information in the document (such as English, German, French); domain (such as electronics, life science, psychology) of the information in the document. In an example, a database arrangement comprising one or more databases comprises all documents constituting information in German language stored in first database, all documents constituting information in English language stored in second database, and all documents constituting information in French language stored in third database. In another example, a database arrangement comprising one or more databases comprises all documents constituting information related to electronics domain stored in first database, all documents constituting information related to psychology stored in second database, and all documents constituting information related to life science stored in third database.

The system comprises the ontological databank comprising the plurality of entity classes. Throughout the present disclosure, the term "ontological databank" refers to a collection of concepts (namely ideas, data, semantic associations and so forth) in a field (namely, subject area, domain and so forth) that details types and properties of the collection of concepts and semantic association thereof. Additionally, the ontological databank may provide information on how a certain concept in a certain field may be associated with one or more concepts in multiple fields.

In an example, the ontological databank may comprise information related to biomedical entities, genes, proteins, drugs, diseases, species, pathways, biological processes, molecular functions, side effects, drug labels, clinical trial parameters, patient demographics and the like. In such example, the ontological databank (including a custom dictionary and a metathesaurus) includes synonyms, derivational and functional form of different Medical Subject Headings (MeSH).

Throughout the present disclosure, the term "entity class" refers to a collection (namely, cluster, group and so forth) of contextually similar information. Furthermore, the entity class may include many synonyms, abbreviations, linguistic variations, morphological forms, and/or derivational entities of the information. In other words, the entity class refers to more than one broad category, into which the information in the database arrangement is categorized, wherein one broad category involves certain distinct characteristics in comparison to the other broad category. In an example, the ontological databank related to psychology domain can comprise entity classes such as behavioral theories, cognitive theories, personality theories, development theories and social theories. In another example, the ontological databank related to life science domain can comprise entity class such as diseases, drug, target, and pathway. The ontological databank is configured to store details about the entity classes related to a technical field (namely, a subject area, a technical domain and so forth) in ontological databank, wherein said details are indicative of types of entity classes, properties of the entity classes and semantic inter-relationships between the entity classes. Optionally, the ontological databank is configured to store the details about the entity classes in a structured manner.

Furthermore, each of the plurality of entity classes comprises concepts. Throughout the present disclosure, the term "concepts" refers to concepts (namely topics, subject areas) relating to a specific domain (namely, subject matter, field of study). Additionally, a given concept and corresponding conceptual synonyms of the given concept have common characteristics associated with them. Specifically, the characteristics relate to a meaning, properties, contextual usage and so forth. Furthermore, a given concept, comprises certain distinct characteristics in comparison to the other concept. Each concept in the ontological databank is associated with only one entity class. Each entity class in the ontological databank is associated with one or more concepts. In an example, an entity class such as lung diseases comprises concepts such as lung cancer, asthma, pneumonia. In another example, an entity class such as lung cancer therapy comprises concepts such as chemotherapy, immunotherapy, radio therapy. In yet another example, an entity class such as life science comprises concepts such as drug, disease, target, pathway.

The concepts in each of the plurality of entity classes have relationships with concepts in remaining entity classes. Specifically, the relationships between concepts in a first entity class and concepts in a second entity class are comprised in the ontological databank. More specifically, a type (namely, nature, characteristic) the relationships between a pair of concepts in different entity classes is based on the type of the different entity classes. In an example, a concept 'lung cancer' in an entity class 'disease' has a relationship with a concept 'Erbitux' in an entity class 'drug'. In such example, the type of the relationship between the concepts 'lung cancer' and 'Erbitux' is defined by the entity classes 'disease' and 'drug' thereof. In other words, since the entity class 'drug' comprises concept relating to drug that may treat concepts present in the entity class 'disease', the relationship between 'lung cancer' and 'Erbitux' may also have a similar connotation.

The server arrangement is configured to receive the search query from the client device. Subsequently, the server arrangement is configured to segment the search query into one or more query segments. The search query includes one or more query segments (namely, fragments, elements, phrases and so forth) and contextual (namely, conceptual, semantic and so forth) association thereof. Moreover, the query segments are parts of search query having a significant contextual meaning. Furthermore, the processing module is operable to receive a user query having one or more query segments. Moreover, the server arrangement is operable to analyse the user query based on context of elements included therein. Additionally, the user query is in text format. Optionally, the user query may be provided using a command prompt (cmd), user interface (UI) and so forth. In an example, a search query such as 'brain tumor symptoms' is segmented into 'brain tumor' and 'symptoms'. Each query segment has characteristics and a definitive meaning associated with it. The characteristic of the query segment comprises a meaning of the query segment, properties of the query segment and outcomes related to query segment.

Optionally, n-gram model is used for the comparison of the one or more query segments with the plurality of concepts, and the conceptual synonyms of each of the plurality of concepts stored in the lexical database. It will be appreciated that the n-gram model relates to a contiguous sequence of 'n' items from a given one or more query segment, wherein 'n' represents number of query segments within each of the search query. In this regard, the search query having one segment is referred as unigram or one-gram, the sentence having two segments are referred as bigram or two-gram, the sentence having three segments are referred as trigram or three-gram. Similarly, based on the number of the segments, the one or more query segments is referred as 'four-gram', 'five-gram', and so on. In an example, the plurality of segments generated for a search query such as 'top drugs for tumor' may be 'top drugs for tumor', 'top drugs for', 'drugs for tumor', 'top drugs', 'drugs for', 'for tumor', 'top', 'drugs', 'for' and 'tumor'. In such an example, the plurality of segments 'top drugs for tumor' is the four-gram. Similarly, the plurality of segments 'top drugs for', and 'drugs for tumor' could be the trigram or three-gram, the plurality of segments 'top drugs', 'drugs for', and 'for tumor' could be bigram or two-gram and the plurality of segments 'top', 'drugs', 'for' and 'tumor' could be unigram or one-gram.

The server arrangement is configured to identify one or more query concepts associated with the one or more query segments. The server arrangement is configured to analyze the one or more query segments to determine one or more query concepts corresponding to the one or more query segments. The one or more query segments are analyzed to determine one or more query concepts corresponding to the one or more query segments by mapping each of the one or more query segments with the each of the concepts in the ontological database. The mapping is performed by comparing the characteristics of the each of the one or more query segments with the characteristics of each of the concepts in the ontological databank. The one or more concepts having characteristics similar to the characteristics are thereby selected as one or more concepts corresponding to the one or more query segments. The similar characteristics comprise having similar meaning, similar properties and similar outcomes.

In an example, a search query is 'lung cancer symptoms'. In such an example, the search query is segmented into query segment 'lung cancer' and 'symptoms'. In such an example, each of query segments 'lung cancer' and 'symptoms' are mapped with each of concepts in the ontological databank. In such an example, the concept 'lung carcinoma' has characteristics similar to the characteristics of query segment 'lung cancer' and the concept 'traits' has characteristics similar to the characteristics of query segment 'symptoms'. Therefore, 'lung carcinoma' and 'traits' are the query concepts corresponding to query segments 'lung cancer' and 'symptoms'.

Furthermore, each of the one or more query concepts are tagged with the corresponding entity class. Each query concept identified for association with one or more query segment is tagged with corresponding entity class. Furthermore, the each of the one or more query concepts has a specific conceptual significance. Additionally, each of the entity class has a specific conceptual significance. In an example, a search query such as "diseases affecting lungs" is associated with query concepts "lung cancer", "asthma", "pneumonia". In such example, the query concepts "lung cancer", "asthma", "pneumonia" is tagged with entity class "diseases". In another example, a search query such as "cancer Erbitux drug" having query segments "Erbitux", "cancer" and "drug" is associated with query concepts "Erbitux" and "cancer". In such example, the query concepts "Erbitux" and "cancer" is tagged with corresponding entity classes "drugs" and "disease" respectively.

Optionally, the server arrangement is configured to analyze the one or more query concepts associated with one or more query segments to determine the one or more metrics of the relationships of the one or more query concepts by:

identifying relationships of the one or more query concepts with concepts in plurality of entity classes in the ontological databank;

determining an importance score for each of the entity classes corresponding to the one or more query concepts, wherein the importance score of a given entity class is determined based on relationships of one or more query concepts tagged with the given entity class;

identifying, from the entity classes corresponding to the one or more query concepts, at least one entity class with importance score higher than a predetermined threshold; and determining one or more metrics of relationships of the one or more query concepts tagged with the at least one entity class with importance score higher than a predetermined threshold.

Optionally, the server arrangement determines the one or more metrics of the relationships of the one or more query concepts by identifying relationships of the one or more query concepts with concepts in plurality of entity classes in the ontological databank. The one or more query segments have at least one query concept associated therewith. The query concepts associated with one or more query segments have direct or indirect relationship with concepts in the plurality of entity classes in the ontological databank. For example, a query concept related with concept of an entity class "A" may have relationship with concepts in an entity class "B". In one instance, the query concept and the concepts in the plurality of entity classes are identical. In another instance, the query concept and the concepts in the plurality of entity classes have an association therebetween by way of an effect, an order, constituent, application, or any other means of association. Notably, the relationships of the one or more query concepts have relationships with concepts in plurality of entity classes in the ontological databank. In an example, a concept "chemotherapy" associated with an entity class "intervention" may have a relationship "cures" with concept "lung cancer" associated with entity class "disease". The relationship between concepts in a first entity class and a second entity class is comprised in the ontological databank. Therefore, at an instance when a given query concept matches with concept of the first entity class, the relationship between the first entity class and the second entity class is referenced.

Furthermore, optionally, the server arrangement determines the one or more metrics of the relationships of the one or more query concepts by determining an importance score for each of the entity classes corresponding to the one or more query concepts, wherein the importance score of a given entity class is determined based on relationships of one or more query concepts tagged with the given entity class. Notably, the importance score is a grade, numerical value, points, and the like that exhibit a relevance associated with the entity class. The importance score of the given entity class depends upon type and number of relationship associated with query concepts therein. The entity classes corresponding to the one or more query concepts are analyzed by the server arrangement. In an instance, the importance score of a given entity class depends on sum of an importance score of each of the concepts included in the given entity class. In an example, the importance score of an entity class is a sum of the number of the relationships of the concepts associated with the entity class. In an example, the entity class "disease" is related to concepts "asthma", "chemotherapy", "depression" having 5, 6 and 8 relationships respectively with other concepts and concepts in ontological databank, the entity class "disease" will have an importance score of 19 which is sum of 5, 6 and 8.

Optionally, the importance score of an entity class is determined based on number of relationships of one or more query concepts tagged with the entity class. The importance score of the given entity class corresponding to one or more query concepts, wherein the one or more query concepts have a total of N+1 relationships is higher than importance score of another entity class corresponding to one or more query concepts having a total of N relationships. In an example, entity class "clinical trial" has concepts having a total number of 50 relationships with query concept associated with another entity class "drug". Furthermore, another entity class "symptom" comprised in the ontological databank has concepts having a total number of 40 relationships with query concept associated with another entity class "disease". Consequently, the entity class "clinical trial" has an importance score higher than the entity class "symptom".

Optionally, the server arrangement determines the one or more metrics of the relationships of the one or more query concepts by identifying, from the entity classes corresponding to the one or more query concepts, at least one entity class with importance score higher than a predetermined threshold. The predetermined threshold is set by the user dynamically for each search query. Alternatively, the predetermined threshold is set only once and is applicable to each search query. In an example, when the importance score of the plurality of entity classes is a grade, the predetermined threshold is also defined by way of a grade. In another example, when the importance score of the plurality of entity classes are points, the predetermined threshold is also defined by way of points. Furthermore, the plurality of entity concepts having the importance score higher than the predetermined threshold are identified by the server arrangement.

In an embodiment, the search query having only one query segment, has one entity class associated therewith. In such an embodiment, the server arrangement analyzes only one entity class having a relationship with query concept of the query segment. Furthermore, the server arrangement analyzes the entity irrespective of importance score of the entity class. Therefore, the server arrangement analyses the entity class having the importance score less than the predetermined threshold. In an example, the search query such as "lung cancer" has query segment "lung cancer" that is associated with entity class "disease" having an importance score of 20 while the predetermined threshold being 30. In such example, the entity class "disease" is analyzed by the server arrangement.

Optionally, the server arrangement is configured to analyze one or more metrics of relationships of the one or more query concepts tagged with the at least one entity class with importance score higher than the predetermined threshold. The relationships of one or more query concepts tagged with at least one entity classes having importance score higher than the predetermined threshold, are analyzed by the server arrangement. The one or more metrics of relationship is analyzed based on the type of relationship of the query concept with the other query concept and concepts in ontological databank. In a first example, a given query concept of one entity class has only alphabets, while the other query concepts and concepts in ontological databank (having relationships with the given concept) also have only alphabets. In second example, a given query concept of one entity class has only alphabets, while the other query concepts and concepts in ontological databank (having relationships with the given concept) have only numbers. In third example, a given query concept of one entity class has only alphabets, while the other query concepts and concepts in ontological databank (having relationships with the given concept) have alphabets as well as numbers. In fourth example, a given query concept of one entity class has only numbers, while the other query concepts and concepts in ontological databank (having relationships with the given concept) has only alphabets. In fifth example, a given query concept of one entity class has only number, while the other query concepts and concepts in ontological databank (having relationships with the given concept) also has only numbers.

In an example, query concept such as "asthma" of an entity class "lung cancer" having only alphabets has relationship with query concept such as "respiratory infection" of other entity class "symptoms" also having only alphabets. In another example, query concept such as "lung cancer" has a relationship with a concept, "patients", wherein the concept "lung cancer" has only alphabets, but the concept "patients" may include number of patients therein."

The server arrangement is configured to extract one or more documents related to the search query from the database arrangement. The one or more documents are extracted based on the query concepts and the query segments. Specifically, documents related to each of the query concepts and each of the query segments are identified from the database arrangement. In an embodiment, the query concepts are mapped with the plurality of documents in the database arrangement. The term mapping refers to associating and relating the query concept with the plurality of documents in the database arrangement. Mapping of query concepts allow extraction of one or more documents from the database arrangement.

In an example, the query concept "colon cancer" is mapped with the information related to colon cancer such as symptoms of colon cancer, effects of colon cancer and the like. In such example, the information related to colon cancer is thereby extracted from the database arrangement. In an example, document1, document2, document3 and document4 having information of the query concepts and the query segments are extracted from the database arrangement having document1, document2, document3, document4, document5, and document6.

Optionally, the one or more documents are analyzed to determine information related to the search query. Specifically, the one or more documents comprise a large amount of information. However, the large amount of information may not be required by the user. Therefore, the large amount of information is analyzed to determine information relating to the search query. Furthermore, the one or more documents are analyzed in a way to obtain meaningful insights therefrom related to each segments of the search query. Additionally, the one or more documents may be analyzed to obtain prominently recurring information therefrom. In an example, the search query is 'lung cancer egfr', from which 'lung cancer' and 'egfr' are identified as query concepts with entity classes 'disease' and 'target' respectively. In such example, from the entity classes 'disease' and 'target', the relationship identified between the query concepts 'lung cancer' and 'egfr' is "disease occurring as a result of malfunction in the target". Furthermore, in such example, it may be identified that the query concept 'lung cancer' with entity class 'disease' has a relationship with a query concept 'NTPD1'. Therefore, in such example, from the one or more documents extracted from the database arrangement, information relating to the search query may comprise information relating to the query concepts 'lung cancer' and 'egfr', and information relating to the query concept 'lung cancer' and concept 'NTPD1'. It will be appreciated that despite absence of 'NTPD1' from the search query; information relating to NTPD1 is included in information relating to the search query. Beneficially, the search is not merely keyword-based, and considers relationships of the query segments in the search query.

The server arrangement is configured to determine a data structure for the information related to the search query based on one or more metrics of the relationships of the one or more query concepts, wherein the information related to the search query is based on one or more documents, retrieved from the database arrangement. Throughout the present disclosure, the term "data structure" refers to a collection of data values, relations amongst the data values comprised in the data structure, and function or operations that can be performed on the data values. Additionally, the data values are represented in the data structure as nodes. Pursuant to embodiments of the present disclosure, the data structure comprises the information related to the search query. Moreover, the information related to the search query is represented in the data structure so as to provide significant insights to a user. In other words, the data structure refers to representation of the information related to the search query extracted from the database arrangement. Additionally, the data structure is determined based on the information related to the search query. Optionally, determination of the data structure is performed based on the information related to the query concepts in the search results.

Optionally, the ontological databank further comprises a plurality of predefined data structures and the server arrangement is configured to determine the data structure for the one or more documents from the plurality of predefined data structures. Specifically, the ontological databank comprehends a plurality of predefined data structures. More specifically, examples of the predefined data structures include, but are not limited to, a network graph, a bar graph, a histogram, a pie chart, a scatter plot, and a line graph.

Furthermore, the server arrangement analyses the information related to the search query so as to determine the data structure from the plurality of predefined data structures.

More optionally, the plurality of predefined data structures have characteristics associated therewith. In an example, the predefined data structure may be a network graph. In such case, the characteristics associated with the network graph may include data values represented as a node, relation between the data values represented as a connecting line and so forth. In another example, the predefined data structure may be a bar graph. In such case, the characteristics associated with the bar graph may include at least one axis, a scale for the at least one axis, and so forth.

In an embodiment, the server arrangement may determine a network graph as the data structure for the information related to the search query from the plurality of predefined data structures. In an example, the bar graph data structure represents the information related to the search query, wherein the search query is "lung cancer". Moreover, the search query may have relationship with query concept "effect". The information related to the search query may comprise information relating to effect of lung cancer on plurality of organs of body. In such case, a relation is defined between the plurality of organs (such as, heart, kidney, and intestine) in the body. Furthermore, the organs are defined as nodes of the network graph that are further linked to the lung cancer node by way of a plurality of lines. Moreover, a length of the plurality of lines may represent a nature (such as, closely related, and so forth) of the relation between the organ and lung cancer. Beneficially, the network graph data structure provides analytics which allows inferences such as body organs affected by lung cancer to be obtained conveniently.

In another embodiment, the server arrangement may determine a bar chart as the data structure for the information related to the search query from the plurality of predefined data structures. It will be appreciated that such data structure may be represented in a two-dimensional space or a three-dimensional space. In an example, the bar graph data structure represents the information related to the search query, wherein the search query is "lung cancer". Moreover, the search query may have relationship with query concept "impact". The information related to the search query may comprise information relating to number of people affected by the lung cancer across a plurality of countries in a defined number of years. In such case, the number of people affected by the lung cancer may be represented on one axis of the three-dimensional space, the plurality of countries may be represented on a second axis of the three-dimensional space, and the defined number of years may be represented on a third axis of the three-dimensional space. Beneficially, the bar graph data structure provides analytics that allows inferences such as country having most people affected by lung cancer to be obtained conveniently.

In yet another embodiment, the server arrangement may determine a pie chart as the data structure for the one or more documents from the plurality of predefined data structures. In an example, the pie chart data structure represents the information related to the search query, wherein the search query is "lung cancer". Moreover, the search query may have relationship with query concept "chance". The information related to the search query may comprise information relating to chance of a plurality of peoples being affected by lung cancer. In such case, a chance of a first person, who smokes, being affected by lung cancer is depicted in the pie chart data structure by way of a specified color such as, red. Furthermore, the pie chart data structure depicts a chance of a second person, who does not smoke, being affected by lung cancer is depicted by way of blue color. Beneficially, the pie chart data structure provides analytics which allows inferences such as a person having higher chance of getting affected by lung cancer to be obtained conveniently.

Optionally, the server arrangement is further configured to provide the information relating to the search query in the plurality of predefined data structures, in response to an input from a user of the client device. Specifically, the server arrangement may determine a plurality of data structure from the predefined data structure for representation of the information related to the search query. Consequently, the server arrangement may provide (namely, render) the plurality of data structure for the information related to the search query to the user via the client device. In an embodiment, the user may specify the data structure for representation of the information related to the search query. In an example, the user may specify data structure for representation of the information related to the search query as pie chart, network graph, bar graph, and histogram. In such case, the server arrangement may provide the information relating to the search query by way of the plurality of data structures defined by the user.

The server arrangement is configured to render, on the client device, the information related to the search query presented in the data structure. As mentioned previously, the information related to the search query can be represented by way of a plurality of the data structure such as pie chart, bar chart, network graph, and so forth. Moreover, such information related to the search query presented in the data structure is rendered on the display of the client device. Optionally, the client device may render the information related to the search query presented in the data structure on a user interface of the client device provided by the system.

In an exemplary implementation of the present disclosure, the search query may be "Alice". The query concept identified with the search query may be "individual" tagged with the entity class "author". It may be determined from the ontological databank that concepts in the entity class "author" have relationships with the entity class "publications". Furthermore, concepts within the entity class "author" may have relationships therebetween. Therefore, from the determined relationships, a data structure of network graph may be determined. Consequently, one or more documents relating to the search query are extracted from the database arrangement, wherein the one or more documents comprise data relating to connections of "Alice" with multiple individuals. Subsequently, names of individuals connected to "Alice" are identified as information relating to the search query. Thereafter, the individuals are represented as nodes in the network graph, wherein the network graph includes connections between the nodes. Additionally, or alternatively, optionally, a second data structure as a pie chart is identified. In the pie chart, information relating to the publications authored by "Alice" are represented in the pie chart, wherein the pie chart is sectioned based on topics of the publications.

The present disclosure also relates to the method as described above. Various embodiments and variants disclosed above apply mutatis mutandis to the method.

Optionally, the method comprises analyzing the one or more query concepts associated with one or more query segments to determine the one or more metrics of the relationships of the one or more query concepts by:

identifying relationships of the one or more query concepts with concepts in plurality of entity classes in the ontological databank;

determining an importance score for each of the entity classes corresponding to the one or more query concepts, wherein the importance score of a given entity class is determined based on relationships of one or more query concepts tagged with the given entity class;

identifying, from the entity classes corresponding to the one or more query concepts, at least one entity class with importance score higher than a predetermined threshold; and determining one or more metrics of relationships of the one or more query concepts tagged with the at least one entity class with importance score higher than the predetermined threshold.

Optionally, the ontological databank further comprises a plurality of predefined data structures and the method comprises determining the data structure for the information related to the search query from the plurality of predefined data structures.

Optionally, the method further comprises providing the information related to the search query in the plurality of predefined data structures, in response to an input from a user of the client device.

DETAILED DESCRIPTION OF THE DRAWINGS

Figure 1:
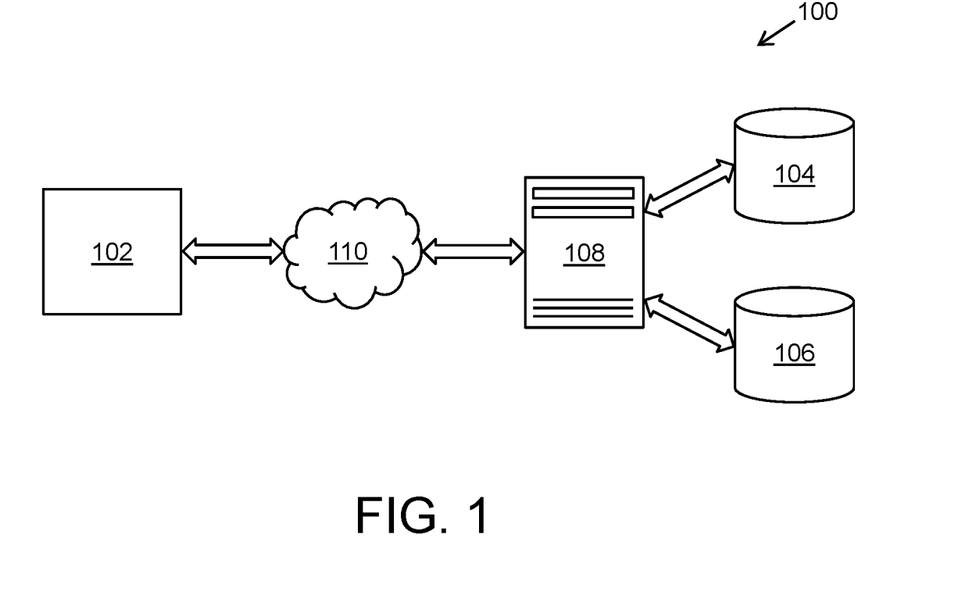
FIG. 1 illustrates a network environment of a system for presenting information related to a search query, in accordance with an embodiment of the present disclosure.

Referring to FIG. 1, illustrated is a network environment of a system 100 for presenting information related to a search query, in accordance with an embodiment of the present disclosure. The system 100 when operated presents the search results in a comprehensible manner. The system 100 comprises a client device 102 configured to receive the search query, a database arrangement 104, an ontological databank 106, and a server arrangement 108. The ontological databank 106 comprises a plurality of entity classes, wherein each of the plurality of entity classes comprises concepts therein, and wherein the concepts in each of the plurality of entity classes have relationships with concepts in remaining entity classes. The server arrangement 108 is communicably coupled to the client device 102 via a communication network 110. Furthermore, the server arrangement 108 is communicably coupled to the database arrangement 104 and the ontological databank 106.

Figure 2:
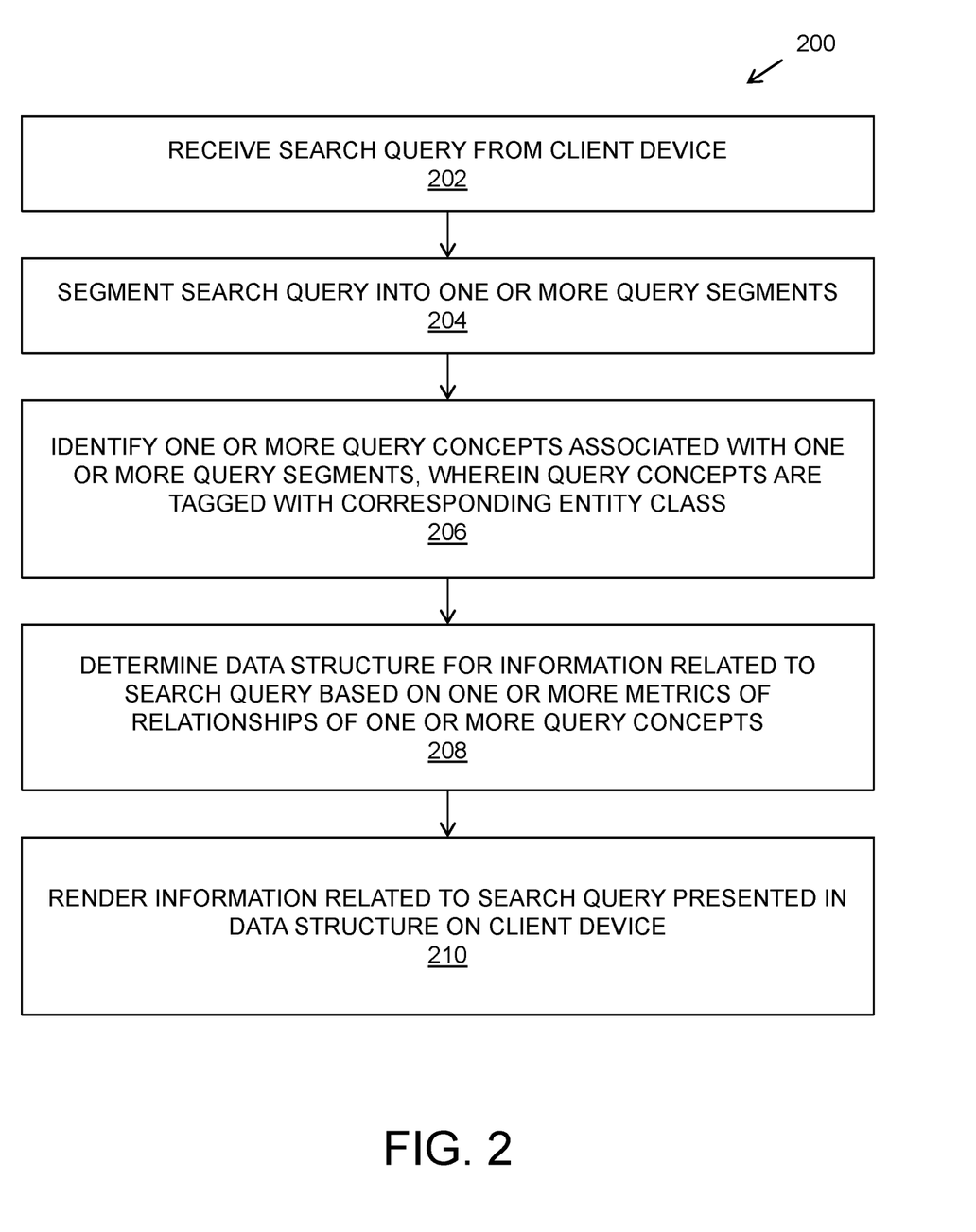
FIG. 2 illustrates steps of a method of presenting information related to a search query, in accordance with an embodiment of the present disclosure.

Referring to FIG. 2, illustrated are steps of a method 200 of presenting information related to a search query, in accordance with an embodiment of the present disclosure. At step 202, the search query is received from the client device. At step 204, the search query is segmented into one or more query segments. At step 206, one or more query concepts associated with the one or more query segments are identified. Notably, each of the one or more query concepts are tagged with a corresponding entity class. At step 208, a data structure for the information related to the search query based on one or more metrics of the relationships of the one or more query concepts is determined. The information related to the search query is based on one or more documents, retrieved from the database arrangement. At step 210, the information related to the search query presented in the data structure is rendered on the client device.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for presenting information related to a search query, wherein the system comprises:
   a client device configured to receive the search query;
   a database arrangement;
   an ontological databank, comprising a plurality of entity classes, wherein each of the plurality of entity classes is a collection of contextually similar information and comprises concepts therein, and wherein the concepts in each of the plurality of entity classes is a subject area relating to a specific domain and have relationships with concepts in remaining entity classes; and
   a server arrangement comprising one or more processors communicably coupled to the client device, the ontological databank and the database arrangement, wherein the server arrangement is configured to:
      receive the search query, from the client device;
      segment the search query into one or more query segments;
      identify one or more query concepts associated with the one or more query segments, wherein each of the one or more query concepts are tagged with a corresponding entity class;
      determine a data structure to represent the information related to the search query based on the relationships of the one or more query concepts,
      wherein the data structure is determined by identifying relationships of the one or more query concepts with concepts in a plurality of the entity classes in the ontological databank,
      wherein the information related to the search query is based on one or more documents, retrieved from the database arrangement, and
      wherein the server arrangement is further configured to analyze the one or more query concepts associated with one or more query segments using an n-gram model relating to a contiguous sequence of 'n' items from a given one or more query segment, wherein 'n' represents a number of query segments within the search query by:
         identifying relationships of the one or more query concepts with concepts in the plurality of entity classes in the ontological databank;
         determining an importance score for each of the entity classes corresponding to the one or more query concepts, wherein the importance score exhibits a relevance associated with the entity class, wherein the importance score of a given entity class is determined based on relationships of one or more query concepts tagged with the given entity class;
         identifying, from the entity classes corresponding to the one or more query concepts, at least one entity class with an importance score higher than a predetermined threshold; and
         determining relationships of the one or more query concepts tagged with the at least one entity class with an importance score higher than the predetermined threshold; and
      render, on the client device, the data structure representing the information related to the search query.

2. The system of claim 1, wherein the ontological databank further comprises a plurality of predefined data structures and the server arrangement is configured to determine the data structure for the information relating to the search query from the plurality of predefined data structures.

3. The system of claim 2, wherein the server arrangement is further configured to provide the information relating to the search query in the plurality of predefined data structures, in response to an input from a user of the client device.

4. The system of claim 2, wherein each of the plurality of predefined data structures have characteristics associated therewith.

5. The system of claim 1, wherein the importance score of an entity class is determined based on number of relationships of one or more query concepts tagged with the entity class.

6. A method of presenting information related to a search query, wherein the method is implemented via a system comprising:
   a client device configured to receive the search query;
   a database arrangement;
   an ontological databank, comprising a plurality of entity classes, wherein each of the plurality of entity classes is a collection of contextually similar information and comprises concepts therein, and wherein the concepts in each of the plurality of entity classes is a subject area relating to a specific domain and have relationships with concepts in remaining entity classes; and
   a server arrangement comprising one or more processors communicably coupled to the client device, the ontological databank and the database arrangement, wherein the method comprises:
      receiving the search query, from the client device;
      segmenting the search query into one or more query segments;
      identifying one or more query concepts associated with the one or more query segments, wherein each of the one or more query concepts are tagged with a corresponding entity class;
      determining a data structure to represent the information related to the search query based on the relationships of the one or more query concepts,
      wherein the data structure is determined by identifying relationships of the one or more query concepts with concepts in a plurality of the entity classes in the ontological databank,
      wherein the information related to the search query is based on one or more documents, retrieved from the database arrangement, wherein the method further comprises analyzing the one or more query concepts associated with one or more query segments using an n-gram model relating to a contiguous sequence of 'n' items from a given one or more query segment, wherein 'n' represents a number of query segments within the search query by:
         identifying relationships of the one or more query concepts with concepts in the plurality of entity classes in the ontological databank;
         determining an importance score for each of the entity classes corresponding to the one or more query concepts, wherein the importance score exhibits a relevance associated with the entity class, wherein the importance score of a given entity class is determined based on relationships of one or more query concepts tagged with the given entity class;
         identifying, from the entity classes corresponding to the one or more query concepts, at least one entity class with an importance score higher than a predetermined threshold; and determining relationships of the one or more query concepts tagged with the at least one entity class with an importance score higher than the predetermined threshold; and rendering, on the client device, the data structure representing the information related to the search query.

7. The method of claim 6, wherein the ontological databank further comprises a plurality of predefined data structures and the method comprises determining the data structure for the information related to the search query from the plurality of predefined data structures.

8. The method of claim 7, further comprising providing the information related to the search query in the plurality of predefined data structures, in response to an input from a user of the client device.

9. The method of claim 6, wherein each of the plurality of predefined data structures have characteristics associated therewith.

10. The method of claim 6, wherein the importance score of an entity class is determined based on number of relationships of one or more query concepts tagged with the entity class.

* * * * *